HOT ISOSTATIC PRESSING USING A VITREOUS CONTAINER

Original Filed Feb. 28, 1968

United States Patent Office

Re. 28,301
Reissued Jan. 14, 1975

28,301
HOT ISOSTATIC PRESSING USING A VITREOUS CONTAINER

Charles J. Havel, 162 Proctor Blvd., Utica, N.Y. 13501

Original No. 3,622,313, dated Nov. 23, 1971, Ser. No. 734,822, Feb. 28, 1968, which is a continuation-in-part of abandoned application Ser. No. 636,700, May 8, 1967. Application for reissue Nov. 19, 1973, Ser. No. 416,967

Int. Cl. B22f *3/14*

U.S. Cl. 75—223 28 Claims

Matter enclosed in heavy brackets [ ] appears in the original patent but forms no part of this reissue specification; matter printed in italics indicates the additions made by reissue.

ABSTRACT OF THE DISCLOSURE

Hot compacting of metallic powders in a vitreous evacuated container of a predetermined shape corresponding to the shape of the densified object desired by subjecting the container to a temperature sufficient to render the container plastic and the contents densifiable, by the application of external pressure upon the container walls.

This application is a continuation in part of my application Ser. No. 636,700, filed May 8, 1967, *now abandoned.*

This invention relates to a process of hot compacting metallic powders into ingots or objects of predetermined shape.

The invention is directed to the formation of objects of various shapes from powdered metal or metal oxides such as beryllium oxide and the like and combinations of metallic and inorganic nonmetallic particulate material, by what may be called hot isostatic pressing. The pressing comprises the placing of such powders in containers, or capsules of glass or other vitreous substances, the container or capsule having an internal shape corresponding essentially to the shape of the finished articles to be produced by the metallic powder. The container or capsule is of a vitreous substance capable of maintaining its shape under the temperatures necessary to cause densification of the powdered metal contained therewithin, allowance being made to compensate for size change when the capsule is under pressure and subjected to the heat required for densification of the powdered contents.

More particularly the invention contemplates the densification of powdered metal while contained in a glass or equivalent container, the characteristics of which in relation to the characteristics of the powdered metal is such that the glass of the container will hold its shape without deforming except to plastically shrink until the powdered metal core develops enough mechanical strength so as to be capable of supporting the glass shape through further shrinkage and compaction. The glass may be conveniently blow molded, slip cast, or pressed to any desired shape before filling the same with the powder.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Referring to FIGS. 1–4 of the drawings there is shown a capsule or container 18 or 18' having metallic powder 20 therewithin. The container may be of any shape desired so as to produce an article of predetermined shape upon densification of the metallic powder therewithin.

It may be a blow molded, slip cast or pressed glass container, and given its shape by the shape of the mold.

Figure 1:
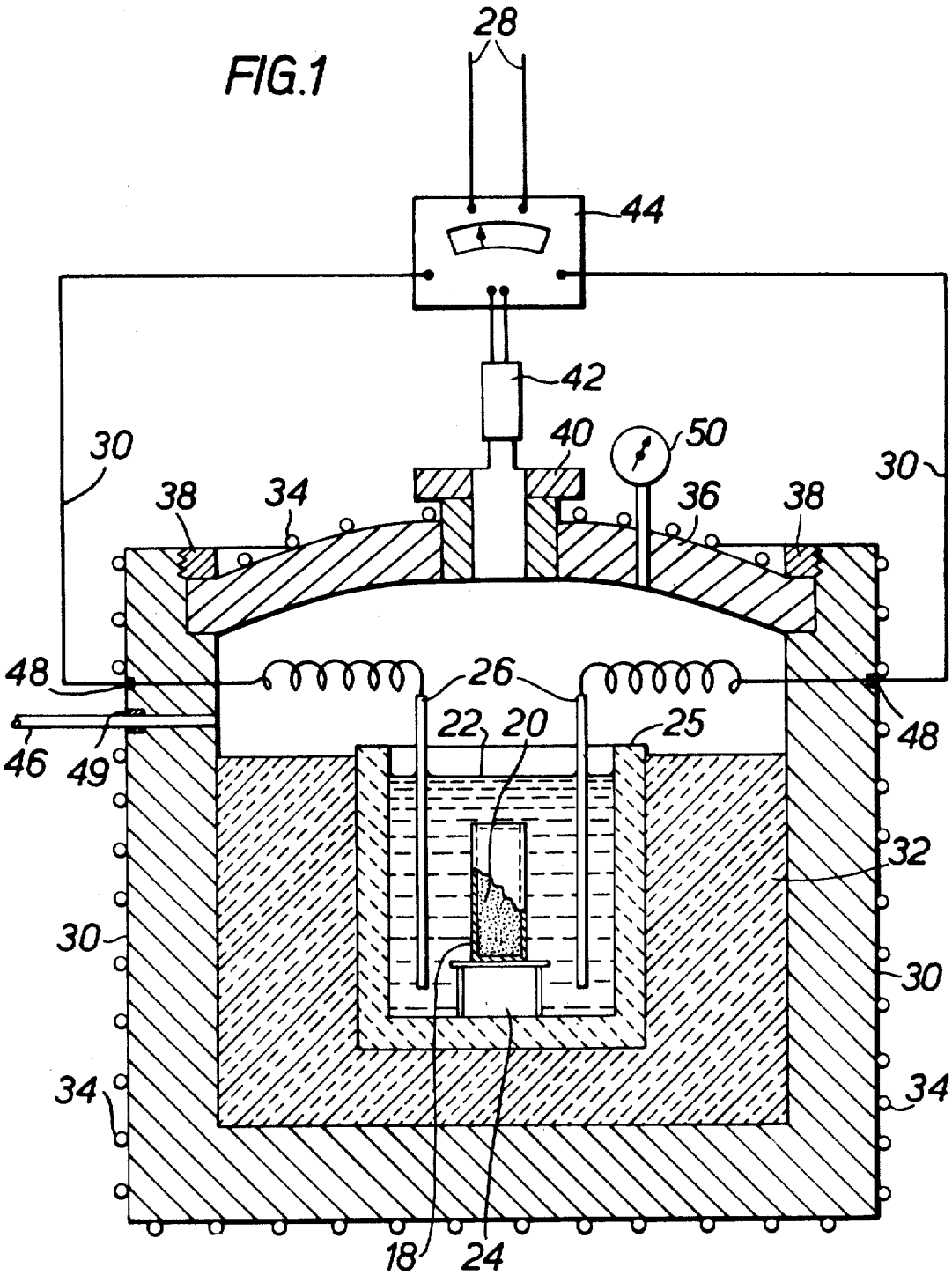
FIG. 1 shows a vessel containing a pot within which resistance heating in a salt bath may be employed.

In FIG. 1 the container 18 is shown placed on a support 24, surrounded by salt 22 contained within the ceramic or brick pot 25. The salt is heated electrically by electrodes 26 connected by leads 30 to a high amperage low voltage source of alternating current which may be supplied through a recorder and controller 44.

Figure 2:
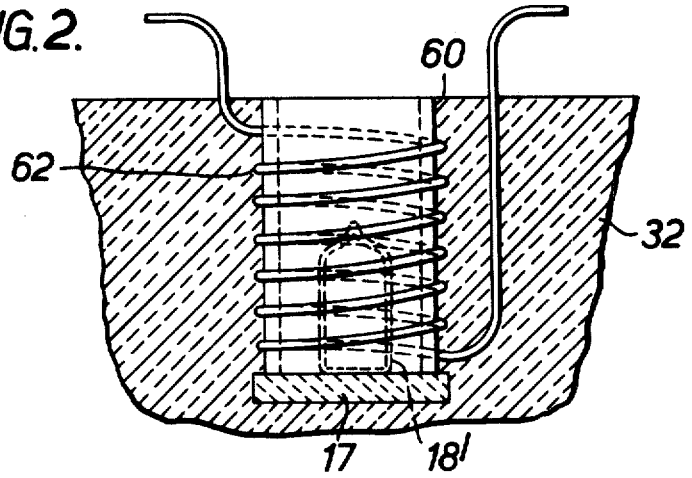
FIG. 2 shows the vessel provided with a muffle having a resistance heating element.

In FIG. 2 the insulation 32 is shown as extending to a ceramic or metallic muffle 60 heated by a resistance heating element 62 connected to a suitable source of power as desired, the muffle surrounding the container 18' of glass or the like having the powdered metal within, which may rest on a ceramic plate 17.

Figure 3:
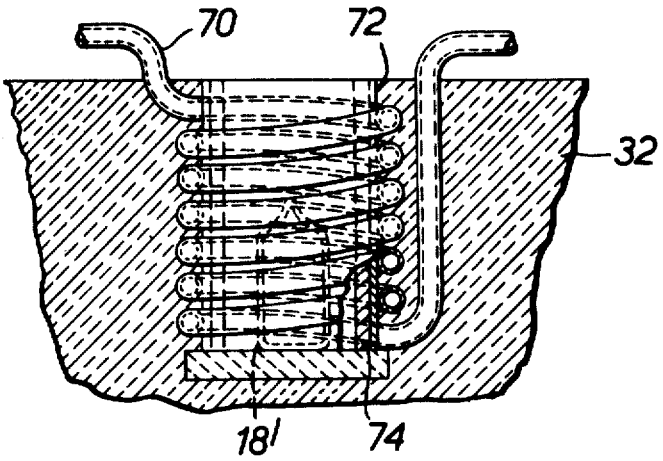
FIG. 3 shows the vessel provided with a susceptor heated by an induction coil.
Figure 4:
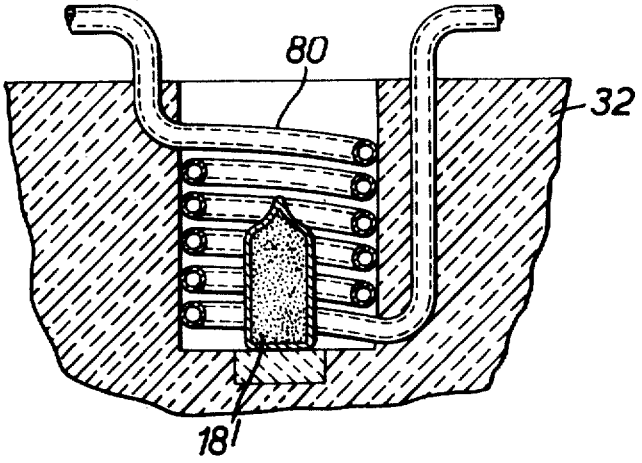
FIG. 4 shows the vessel provided with a coil for high frequency induction heating.

In FIG. 3 there is shown a tubular graphite susceptor 74 of carbon or other suitable material with a ceramic surrounding layer and support 72 for a water cooled induction coil 70, and in FIG. 4 there is shown a water cooled high frequency induction coil 80. In each of FIGS. 2, 3 and 4 the glass container may rest on a ceramic base 17 in the manner shown, and may be surrounded by air or gas introduced into the vessel 30.

The pot 25 or heating coils of FIGS. 2, 3 and 4 are surrounded by heat insulation 32, within a pressure vessel 30, having a lid or closure 36 secured to the vessel by a threaded ring 38, the lid being seated and sealed to the vessel by suitable gaskets. The vessel is provided with a conduit 46 adapted for connection to a source of compressed air or gas, and an indicator 50 is provided to observe the pressure. The lid 36 is provided with a sight port 40 for an optical pyrometer 42, which may be connected to the controller to provide regulation. The vessel and lid may be provided wih water cooling coils.

The filled and sealed container may be preheated to the strain point to reduce shock and in the apparatus as shown in FIG. 1, the container is placed in the hot molten salt bath 22. Thereafter the vessel is closed and subjected to high pressure air or gas if desired. The glass container and powdered metal may thereby be subjected to differential pressure due to both vacuum within the container as well as gas pressure applied to the vessel. Equal pressure from all directions is exerted upon the container, and due to the plasticity of the glass, at the pressing temperature, the powder will be subjected to compacting forces allowing it to be densified into a shape corresponding to the internal wall of the container.

After the elapse of an appropriate time, at the selected temperature and pressure, the vessel 30 is bled to atmospheric pressure, the end closure removed, and the densified compacted object is extracted from the molten salt. Due to the wide difference in thermal shrinkage of the compacted metal and the surrounding glass, the glass will flake off, leaving a glass-free densified metal form.

In practice, the glass container having the internal shape to be produced, with appropriate allowances for size change during densification, is filled with metallic powder, and evacuated, as by a suitable vacuum pump, and is then hermetically sealed. The selection of glass or other vitreous ubstance should be determined by the desired temperature of pressing. It is believed to be critical that the glass employed has a viscosity at the pressing temperature of no more than $10^{14}$ poises.

Following are a number of representative types of glass which may be employed for the purpose, with their respective operating ranges in degrees Centigrade.

| Type of glass | Operating range, ° C. |
|---|---|
| (1) Lead Alkali Silicate | 410–630 |
| (2) Borosilicate (Pyrex) | 550–900 |
| (3) Aluminosilicate | 700–980 |
| (4) 96% Silica (Vycor) | 890–greater than 1600 |
| (5) Fused Silica | 1130–greater than 1600 |

Other sections were flat forged perpendicular to the longitudinal axis on a mechanical press at 2025° F. Successive reductions of 20 percent, 20 percent and 40 percent were taken in one blow each, with no cracking. The forged coupons or flat sections were then heat treated as above and tested.

In addition compacts were formed having a diameter of 2¼ inches and a length of 3 inches, approximately, as above, and thereafter extruded to a diameter of ⅞ inch (6.6 to 1 extrusion ratio) at a temperature of 1975° F. Such extrusions were then heat treated as above and tested. The results of the tests are as follows:

TABLE OF PROPERTIES DETERMINED ON UDIMET 700 COMPACTS

| Condition | Stress rupture at 1,300°F., tensile 1,800°F./18,000 p.s.i. | | | | | | | Grain size (ASTM) | Hardness (Rc) |
|---|---|---|---|---|---|---|---|---|---|
| | | | | Test | | | | | |
| | Hours | Percent El. | Percent RA | UTS (Ks.i.) | .2 YS | Percent El. | Percent RA | | |
| Compacted, and heat treated | 65.8 | 6.6 | 5.6 | 170.3 | 125.0 | 12.0 | 13.1 | 2 | 40 |
| Compacted, heat treated and forged | (1) | (1) | (1) | 177.2 | 136.4 | 22.3 | 22.7 | 6 | 40 |
| Compacted, extended and heat treated | 69.1 | 7.3 | 8.1 | 175.0 | 139.5 | 38.0 | 35.1 | 7 | 41 |

[1] Not determined.

Figure 5:
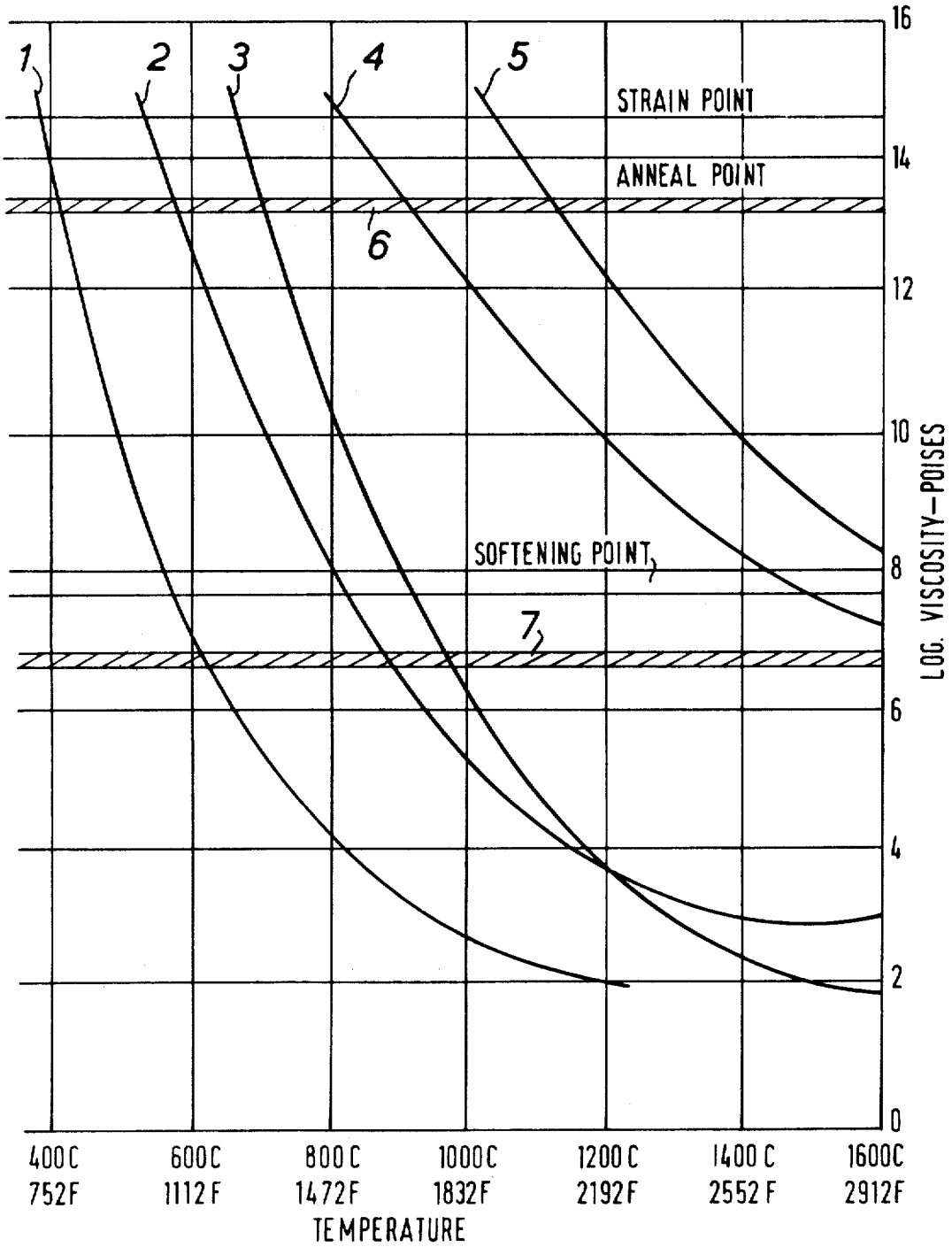
FIG. 5 shows temperature viscosity curves for several types of glass and the useful temperature ranges for each.

The viscosity characteristics in the temperature range appropriate to the procedure herein are indicated by curves 1, 2, 3, 4 and 5 respectively in FIG. 5, curve 1 being that for lead Alkali Silicate glass referred to above, for example. It will be noted that the temperature range for this glass between the anneal point and a lower limit of approximately $10^{6.5}$ poises, as indicated by the anneal point bar 6 and the lower limit bar 7 on FIG. 5 approximates 410–630° C. Below the lower limit, the glass adheres to other objects and will also penetrate into the surface of the powder mass, causing a contaminated layer. If the glass is heated in the vicinity of $10^4$ poises or less there is danger that it will flow to an extent to expose the metal core directly to the compacting gas and thereby destroy the differential pressure necessary for successful compaction.

A glass the type having a temperature range of 410°–530° C. would be suitable for pressing brasses, aluminum and aluminum alloys, and magnesium and its alloys.

A glass of the type whose viscosity-temperature characteristics are illustrated by curve 4 for 96 percent Silica, which contains about 3 percent of Boric Oxide and the balance of other oxides isused for the compaction of a super alloy identified as Udimet 700, (Astrology). This powder includes Aluminum, Titanium, Molybdenum, Chromium, Cobalt and Nickel in the following nominal proportions:

| | Al | Ti | Mo | Cr | Co | Ni | P.p.m. | Mesh |
|---|---|---|---|---|---|---|---|---|
| A | 4.5 | 3.5 | 5 | 15 | 18 | Balance 490 | 0 | −100 |

Such powder when loaded into standard Vycor tubing of 30 mm. outside diameter and of a desired length such as 6 inches, is evacuated to 1 micron vacuum and sealed off. A plurality of such tubes when placed in an autoclave are heated to 1288° C. (2350° F.), stabilized, and then subjected to a gas pressure of 15,000 pounds per square inch for an hour or less.

Upon removal from the autoclave, the density of the pieces so formed was determined to be 8.02 g./cc. or 100 percent of theoretical density. This was then confirmed by fluorescent penetrant inspection and metallographic examination. Sections were cut and heat treated:

2150° F.–4 hours–air cooled
1975° F.–4 hours–air cooled
1550° F.–24 hours–air cooled
and
1400° F.–16 hours–air cooled and the properties determined.

A feature of the technique is that compacting may be done at a temperature betwen the liquidus and solidus temperatures so that incipient melting occurs while the mass is subjected to exterior pressure. The 2350° F. compacting temperature in the previous example is between the liquidus-solidus for the Udimet 700 alloy used. Under these conditions the liquid phase formed at the elevated temperature containing an $M_3B_2$ boride, is believed to flux the oxide film on the surface of each powder particle, allowing base metal to metal contact of the particles, resulting in a true metallurgical bond. It is believed that the surface oxide on each particle dissolves in the liquid phase.

Upon cooling, the vitreous container collapses, compensating for shrinkage of the incipient melt phase as it freezes, thereby eliminating microporosity prevalent in compacts which are liquid phase sintered.

Previous attempts to hot press superalloy powders have been done below the solidus temperature. The resulting compacts have shown remnant surface oxide from the original powder particles which is detrimental to their properties, since a strong metallurgical bond cannot be made due to the oxide film interference. Furthermore hot working, rolling, extrusion, forging, etc., will not mechanically break down the film and the particles never lose their original identity in the compacted mass.

Hot working will deform the particles, but not destroy the oxide film. Upon solution treatment after hot working recrystallization takes place within each film, powder particle, but not across the particle boundary oxide film.

The unique result of hot pressing in the incipient melt area, that is, above the solidus, below the liquidus, is that the original powder particles lose their identity, while at the same time, grain growth is retarded due to the fact that the solid portion of the powder particles that remain, act as nuclei for the grains of the final compact. In essence, the technique will produce extremely fine grain large and small castings which will have improved properties and hot workability over conventionally cast material.

The incipient melting compacting technique is applicable to all alloys and not only to superalloys. In those alloys where the incipient melting phase does not flux particle surface oxide, innocuous additions of boron may be made to cause a boride phase to melt.

In the conventional isopress with a steel or other metal can, the powder is precompacted at room temperature to about 80 percent density in the shape of the piece to be produced and the steel can is built around it. The precompacting is necessary since the steel can cannot shrink to the extent required when going from a loose powder density to a full density without severe ripping (approximately 50 percent loose powder density to 100 percent compact density). The ripping referred to results in a wrinkled surface on the compact. The precompacting process is therefore employed to reduce the shrinkage required of the can.

All of the above is due to the fact that the steel or other metal can cannot easily plastically shear. The vitreous container, on the other hand, accomplishes plastic shear quite readily, and pieces can be produced without precompacting and without wrinkles on the compact surface.

In the pressing example previously described with Udimet 700 no wrinkles were observed even though the powder was loaded into the glass container at a bulk density of 55 percent and was compacted to 100 percent density.

It would appear that the process would not work, since beyond the annealing point of a glass, the container and its contents would deform of their own weight. It might be expected therefore that in the attempt to produce a given shape that the glass container would deform under gravitational forces and therefore produce a misshapen piece.

The factor which prevents the above situation from occurring is the result of the metal core developing enough mechanical strength after the powder filled container passes the annealing point, to cause the core to support the glass shape rather than the glass shape support the metal core.

The development of core strength can be achieved by applying pressure, over and above atmospheric, once the temperature has passed the strain point of the glass employed. The amount of pressure applied is governed by the compacting characteristics of the powder metal core as well as the pressure limitations of the autoclave used.

Some glass-metal powder combinations such as Pyrex and pure iron powder, will retain shape without the aid of pressure superimposed beyond atmospheric.

The method is applicable to such metals as powdered beryllium, superalloys, titanium, etc., and inorganic nonmetallic such as tungsten carbide, beryllium oxide, and also combinations of metallic and nonmetallic composites as well as others. From the foregoing it can be seen that the process is capable of producing hollow parts such as tube blanks, hollow hemispheres, shaped solid articles such as turbine disc blanks, turbine blades, and any other shape for which a container can be formed of glass, or other vitreous substance which on exposure to heat behaves in a glass-like manner.

The shapes so formed may be of the precise shape desired, or so near as to require a minimum of machining or other surface treatment.

While a single form of apparatus has been illustrated and described for use in the process, it is to be understood that the invention is not limited thereto. As various changes in the construction and arrangement and procedures may be made without departing from the spirit of the invention, as will be apparent to those skilled in the art, reference will be had to the appended claims for a definition of the limits of the invention.

What is claimed is:

1. The method producing a densified object from metallic, inorganic nonmetallic and combinations of metallic and inorganic nonmetallic powders, which comprises hermetically sealing under subatmospheric pressure a volume of the powder within a vitreous container having an approximate capacity equal to the volume of powder contained therein; heating the container and contents to render the container plastic and to raise the powder temperature to an appropriate compacting temperature, subjecting the container to external pressure above the container internal pressure to cause collapse of the container about the powder within, to promote densification, and thereafter cooling the container and contents, and thereby effecting removal of the vitreous container from the densified object.

2. A method according to claim 1 wherein the container has an internal configuration corresponding generally to the shape of the densified object desired.

3. A method according to claim 1 wherein the container is a glass and the container and powder are preheated, and subsequently placed in a hot molten salt bath and subjected to the temperature sufficient to cause the powder to densify.

4. A method according to claim 1 wherein the powder includes beryllium.

5. A method according to claim 1 wherein the powder includes tungsten carbide.

6. A method according to claim 1 wherein the powder is a nickel base superalloy.

7. A method according to claim 1 wherein the powder is of a metal alloy and includes a boride providing incipient melting to dissolve surface oxides on the powder particles causing them to bond.

8. A method according to claim 1 wherein the vitreous container is blow molded to a predetermined shape and filled with powder before hermetically sealing of the container.

9. A method according to claim 1 wherein the container is of glass and the container and powder are placed in a furnace and subjected to a temperature sufficient to cause the powder to densify.

10. A method according to claim 1 wherein the powder includes titanium.

11. A method according to claim 1 wherein the powder includes a cobalt base alloy.

*12. The method as set forth in claim 1 wherein the material of which the container is formed has a viscosity not substantially less than $10^{6.5}$ poises at the temperature and pressure at which densification occurs.*

*13. The method according to claim 1 wherein the container has an internal configuration corresponding generally to the shape of the object desired upon completion of the densification.*

*14. The method according to claim 1 wherein the vitreous material of the container is such that the container is rendered sufficiently plastic by said heating that it can undergo collapse when the external pressure is applied, but not so plastic as to lose its shape prior to the mass of powder in the container developing enough mechanical strength to support the container.*

*15. The method according to claim 1 including preheating the container to about the strain point thereof to reduce thermal shock and to render the container plastic, and thereafter further heating the container and contents to an appropriate densification temperature.*

*16. The method of producing a densified object from metallic, inorganic nonmetallic and combinations of metallic and inorganic nonmetallic powders which comprises hermetically sealing under subatmospheric pressure a volume of the powder within a vitreous container having an approximate capacity equal to the volume of powder contained therein, preheating the container to about the strain point thereof to reduce thermal shock and to render the container plastic, and thereafter further heating the container and contents while subjected to differential pressure between the outside and inside of the container to a temperature and differential in pressure sufficient to cause collapse of the container about the powder within, thereby causing the powder to densify, and thereafter cooling the container and contents and removing the container.*

*17. The method as set forth in claim 16 wherein removal of the container is effected by the cooling of the container and contents.*

*18. The method as set forth in claim 16 wherein the material of which the container is formed has a viscosity*

*not substantially less than $10^{6.5}$ poises at the temperature and pressure at which densification occurs.*

*19. The method according to claim 16 wherein the container has an internal configuration corresponding generally to the shape of the densified object desired.*

*20. The method according to claim 16 wherein the powder includes beryllium.*

*21. The method according to claim 16 wherein the powder includes tungsten carbide.*

*22. The method according to claim 16 wherein the powder is a nickel base superalloy.*

*23. The method according to claim 16 wherein the powder is of a metal alloy and includes a boride providing incipient melting to dissolve surface oxides on the powder particles causing them to bond.*

*24. The method according to claim 16 wherein the vitreous container is blow molded to a predetermined shape and filled with powder before hermetically sealing of the container.*

*25. The method according to claim 16 wherein the powder includes titanium.*

*26. The method according to claim 16 wherein the powder includes a cobalt base alloy.*

*27. The method according to claim 16 wherein the container has an internal configuration corresponding generally to the shape of the object desired upon completion of the densification.*

*28. The method according to claim 16 wherein the vitreous material of the container is such that the container is rendered sufficiently plastic by said heating that it can undergo collapse when the external pressure is applied, but not so plastic as to lose its shape prior to the mass of powder in the container developing enough mechanical strength to support the container.*

References Cited

The following references, cited by the Examiner, are of record in the patented file of this patent or the original patent.

UNITED STATES PATENTS

| | | | |
|---|---|---|---|
| 3,340,053 | 9/1967 | Hodge et al. | 75—226 X |
| 3,469,976 | 9/1969 | Iler | 75—223 X |
| 3,599,281 | 8/1971 | Boyer | 75—226 X |
| 3,571,850 | 3/1971 | Pohto | 75—226 X |
| 3,419,935 | 1/1969 | Pfeiler et al. | 425—405 X |
| 3,455,682 | 7/1969 | Barbaras | 75—223 X |
| 3,562,371 | 2/1971 | Bush | 425—405 H |
| 3,356,496 | 12/1967 | Hailey | 75—200 X |
| 3,551,946 | 1/1971 | Backer et al. | 425—405 H |
| 3,328,139 | 6/1967 | Hodge et al. | 75—214 X |
| 2,725,288 | 11/1955 | Dodds | 75—226 |
| 3,160,502 | 12/1964 | Quartullo | 75—226 X |
| 3,340,056 | 9/1967 | Cloran et al. | 75—226 X |
| 3,363,037 | 1/1968 | Levey, Jr. et al. | 75—266 X |

OTHER REFERENCES

Powder Metallurgy, Volume 8, #15, Spring 1965, pp. 117–8, TN 695 p. 54.

Goetzel, C. G., *Treatise on Powder Metallurgy*. Volume IV, part I, pp. 10–11. Interscience, New York, 1963. TN 695 G6.

BENJAMIN R. PADGETT, Primary Examiner

R. E. SCHAFER, Assistant Examiner

U.S. Cl. X.R.

75—200, 201, 202, 203, 204, 206, 214, 226; 264—60, 111, 125, 332; 425—78, 405 H